US010204575B2

(12) United States Patent
Xu et al.

(10) Patent No.: US 10,204,575 B2
(45) Date of Patent: Feb. 12, 2019

(54) DISPLAY PANEL AND DISPLAY DEVICE

(71) Applicants: Shanghai Tianma Micro-electronics Co., Ltd., Shanghai (CN); Tianma Micro-electronics Co., Ltd., Shenzhen (CN)

(72) Inventors: Wei Xu, Shanghai (CN); Xianxiang Zhang, Shanghai (CN); Xiangmin Tan, Shanghai (CN)

(73) Assignees: Shanghai Tianma Micro-electronics Co., Ltd., Shanghai (CN); Tianma Micro-electronics Co., Ltd., Shenzhen (CN)

( * ) Notice: Subject to any disclaimer, the term of this patent is extended or adjusted under 35 U.S.C. 154(b) by 165 days.

(21) Appl. No.: 15/193,822

(22) Filed: Jun. 27, 2016

(65) Prior Publication Data

US 2017/0221437 A1    Aug. 3, 2017

(30) Foreign Application Priority Data

Jan. 29, 2016    (CN) .......................... 2016 1 0066601

(51) Int. Cl.
*G09G 3/36* (2006.01)
*G02F 1/133* (2006.01)

(52) U.S. Cl.
CPC .......... *G09G 3/3614* (2013.01); *G02F 1/133* (2013.01); *G09G 2300/0426* (2013.01); *G09G 2300/0452* (2013.01); *G09G 2320/0247* (2013.01)

(58) Field of Classification Search
CPC ..................... G09G 3/3614; G09G 3/3607
See application file for complete search history.

(56) References Cited

U.S. PATENT DOCUMENTS

2006/0279502 A1* 12/2006 Chang ............... G02F 1/133788
345/95
2008/0278466 A1* 11/2008 Joo ....................... G09G 3/3614
345/205
2013/0154910 A1* 6/2013 Chu .................... H01L 27/3218
345/83

(Continued)

FOREIGN PATENT DOCUMENTS

CN    102623462 A    8/2012
CN    102629059 A    8/2012
CN    104330936 A    2/2015

*Primary Examiner* — Nelson M Rosario
*Assistant Examiner* — Scott D Au
(74) *Attorney, Agent, or Firm* — Anova Law Group, PLLC

(57) ABSTRACT

A display panel and a display device are provided. The display panel comprises a first substrate including scanning lines, data lines, and pixel units including first pixel units and second pixel units; and a second substrate including color units including first color units, second color units, third color units, and fourth color units. The pixel units are arranged into first pixel groups and second pixel groups alternately arranged along an extending direction of the scanning lines. An arrangement of the first pixel units and the second pixel units in the first pixel group is a mirror image of that in the second pixel group. When the data signals with a same polarity are provided to the first pixel units and the second pixel units, the first pixel units generate an electric field having an inverted direction from an electric field generated by the second pixel units.

20 Claims, 12 Drawing Sheets

(56) References Cited

U.S. PATENT DOCUMENTS

2013/0286005 A1* 10/2013 Liao .................... H04N 13/337
                                                      345/419
2015/0200206 A1*  7/2015 Liu ................... G02F 1/136286
                                                       257/72
2016/0370669 A1* 12/2016 Mok .................... G09G 3/3614

* cited by examiner

DISPLAY PANEL AND DISPLAY DEVICE

CROSS-REFERENCES TO RELATED APPLICATIONS

This application claims priority of Chinese Patent Application No. 201610066601.1, filed on Jan. 29, 2016, the entire contents of which are hereby incorporated by reference.

FIELD OF THE INVENTION

The present disclosure generally relates to the field of flat panel display technology and, more particularly, relates to a display panel and a display device thereof.

BACKGROUND

In recent years, display devices have been widely, and liquid crystal display (LCD) are the most common among them. For an LCD device, when a voltage is applied between the pixel electrodes and the common electrodes of sub-pixels of an LCD layer, liquid crystal (LC) molecules are reoriented or tilted by the generated electric filed and, in this way, the backlight transmittance of the sub-pixels is modulated to display images.

However, if the voltage applied to the LC molecules keeps the same polarity (i.e., positive or negative polarity) for long time, the properties of the LC molecules may change and, accordingly, the LC molecules may be unable to accurately control the backlight transmittance according to the applied voltage. In addition, the voltage applied to the sub-pixels displaying a same color often have the same polarity. These factors may cause several problems in the LCD display, such as, image flickering, image degradation, etc.

The disclosed display panel and display device are directed to solve one or more problems set forth above and other problems.

BRIEF SUMMARY OF THE DISCLOSURE

One aspect of the present disclosure provides a display panel. The display panel comprises a first substrate including a plurality of scanning lines, a plurality of data lines intersecting the scanning lines and providing data signals, and a plurality of pixel units defined by the scanning lines and the data lines, wherein the pixel units include a plurality of first pixel units and a plurality of second pixel units; and a second substrate including a plurality of color units corresponding to the plurality of pixel units and including a plurality of first color units, a plurality of second color units, a plurality of third color units, and a plurality of fourth color units. The plurality of pixel units are arranged into a plurality of first pixel groups and a plurality of second pixel groups alternately arranged along an extending direction of the scanning lines, the first pixel group includes an equal number of first pixel units and second pixel units, the second pixel group includes an equal number of first pixel units and second pixel units, an arrangement of the first pixel units and the second pixel units in the first pixel group is a mirror image of an arrangement of the first pixel units and the second pixel units in the second pixel group. When the data signals with a same polarity are provided to the first pixel units and the second pixel units through the data lines, the first pixel units generate an electric field having an inverted direction from an electric field generated by the second pixel units.

Another aspect of the present disclosure provides a display device comprising the display panel thereof.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 1:
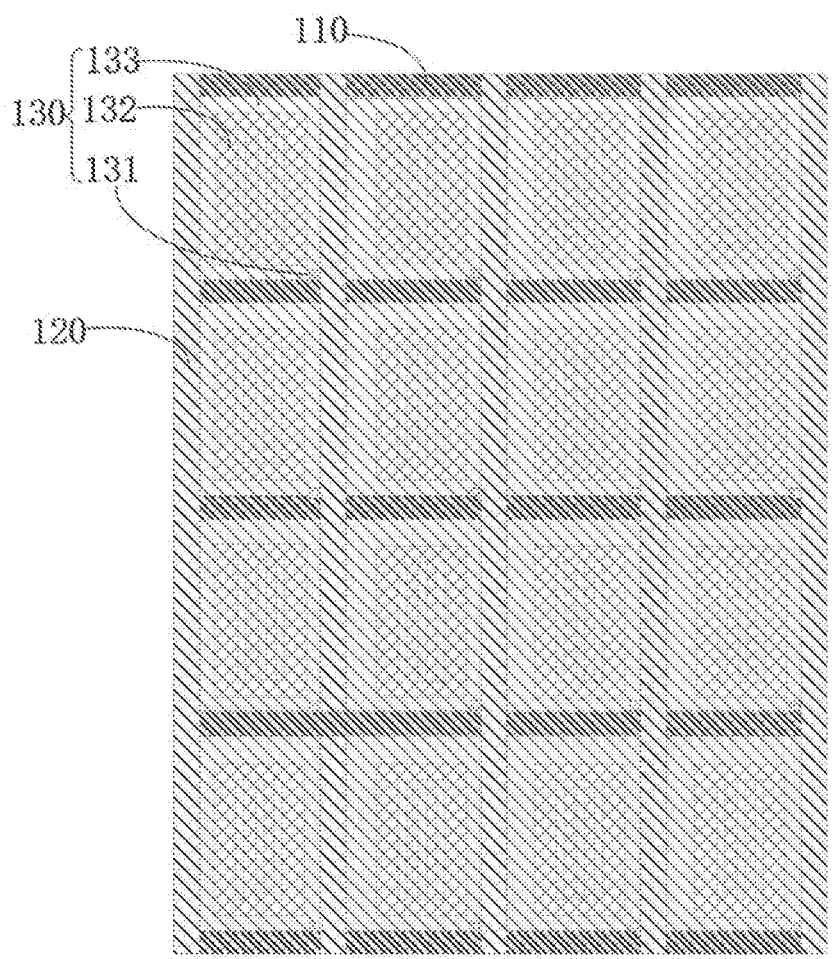
FIG. 1 illustrates a top view of a conventional display panel.

FIG. 1 illustrates a top view of a conventional display panel. As shown in FIG. 1, the thin-film transistor liquid crystal display (TFT-LCD) often includes a plurality of scanning lines 110, a plurality of data lines 120, and a plurality of pixel units 130 defining by the scanning lines 110 intersecting the data lines 120. The pixel units 130 may be arranged in a matrix, i.e., pixel matrix. In particular, each pixel unit 130 includes a thin-film transistor (TFT) 131, a pixel electrode 132, and a common electrode 133. Each TFT 131 has a gate electrode electrically connected to the scanning line 110, a source electrode electrically connected to the data line 120, and a drain electrode electrically connected to the pixel electrode 132.

Scanning signals are provided to the scanning lines 110 for switching on/off the TFTs 131, and data signals are provided to the data lines 120 for applying a certain voltage to the pixel electrodes 132. Due to the voltage difference between the pixel electrode 132 and the common electrode 133, a planar electric field capable of reorienting the liquid crystal molecules is generated within the pixel unit.

To minimize the polarization (and rapid permanent damage) of LC materials caused by a direct current (DC) signal, the data lines 120 are often provided with an alternating current (AC) signal. That is, in two consecutive image frames, data signals with a reversed polarity (i.e. voltages with a reversed polarity) are applied to the pixel unit 130, such that the direction of the electric field between the pixel electrode 132 and the common electrode 133 within the pixel unit 130 is also reversed, accordingly. Such a process is known as a polarity inversion. According to the polarity of the data signals (i.e., the voltage polarity) applied to the pixel units 130 in one image frame, the polarity inversion may be implemented in four different ways: frame inversion, column inversion, line or row inversion, and dot inversion.

In a four-color display panel, a color film substrate includes a plurality of color units or color barriers of four different colors, for example, a plurality of red color barriers R, a plurality of green color barriers G, a plurality of blue color barriers B, and a plurality of white color barriers W, which are one-to-one corresponding to a plurality of pixel units to form a plurality of red pixel units R, a plurality of green pixel units G, a plurality of blue pixel units B, and a plurality of white pixel units W, respectively. The plurality of pixel units form a RGBW pixel unit array.

Figure 2A:
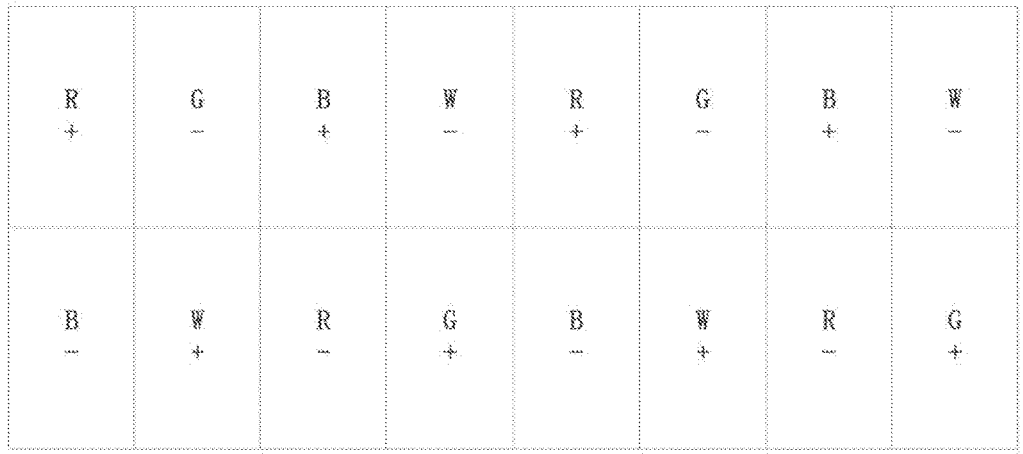
FIG. 2a illustrates pixel unit a voltage polarity distribution of a first image frame according to a dot inversion driving method.
Figure 2B:
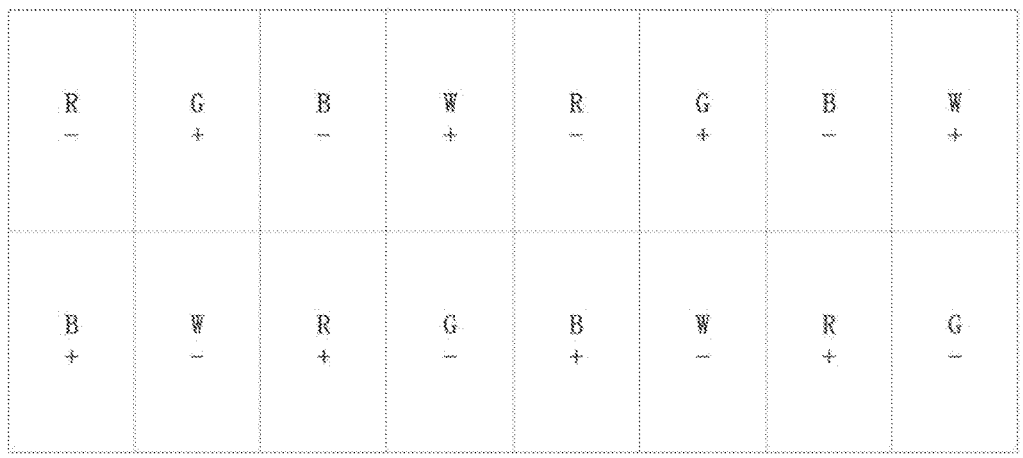
FIG. 2b illustrates a pixel unit voltage polarity distribution of a second image frame according to a dot inversion driving method.

FIG. 2a illustrates a pixel unit voltage polarity distribution of a first image frame according to a dot inversion driving method. FIG. 2b illustrates pixel unit voltage polarity distributions of a second image frame according to a dot inversion driving method. When the RGBW pixel unit array is driven by the dot inversion driving method, in the first image frame, as shown in FIG. 2a, the voltages applied to adjacent pixel units have a reversed polarity. In the second image frame, as shown in FIG. 2b, the voltages applied to adjacent pixel units also have a reversed polarity.

Referring to FIGS. 2a-2b, comparing the first image frame to the second image frame, the voltages applied to a same pixel unit have a reversed polarity. However, in both the first image frame and the second image frame, in a row of pixel units (i.e., a pixel unit row), the voltages applied to the pixel units with a same color still have a same polarity. For example, as shown in FIG. 2a, the voltages applied to the red pixel units R in the upper pixel unit row will have a positive polarity (+), and the voltages applied to the red pixel units R in the lower pixel unit row all have a negative polarity (−). Similarly, as shown in FIG. 2b, the voltages applied to the red pixel units R in the upper pixel unit row all have a negative polarity (−), and the voltages applied to the red pixel units R in the lower pixel unit row all have a positive polarity (+).

Thus, when a single color image or a noticeable single color image element is displayed, the same voltage polarity in the pixel units with a same color in a same pixel unit row may result an image flickering, degrading the image quality. For example, when a pure red color image or a noticeable red color image element is displayed, the same voltage polarity in the red pixel units in a same pixel unit row may result an image flickering.

That is, to prevent polarization (and rapid permanent damage) of the LC materials, the voltages applied to the pixel units of alternate image frames have a reversed polarity. However, it is very difficult to get exactly the same voltage on the pixel units in both polarities, the brightness of the pixel units tends to flicker to some extent. If the voltage polarity applied to all the pixel units are inverted at once, then the flicker would be highly objectionable.

The present disclosure provides an improved display panel. Through configuring the voltage polarity of nearby pixel units with a same color in a same pixel unit row to be in anti-phase, the flickering over areas of any significant size may be cancelled out. In this way, the flickering may become imperceptible for most "natural" images.

Figure 3A:
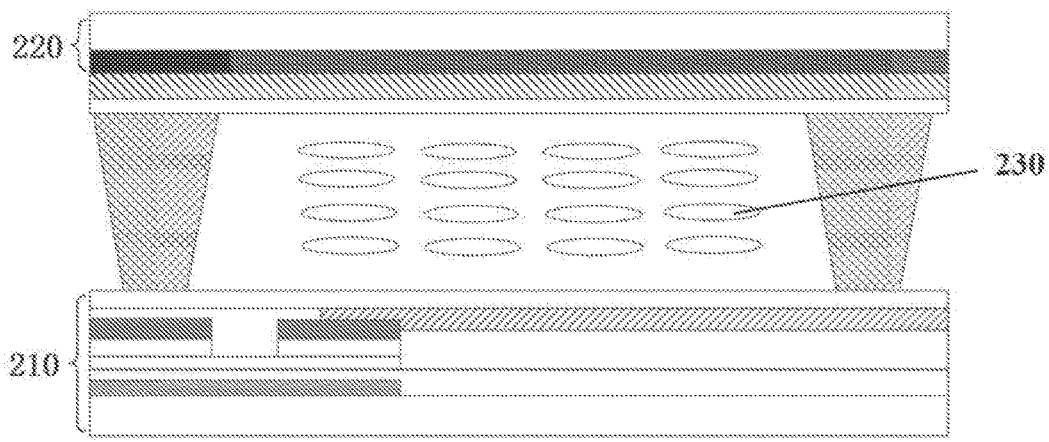
FIG. 3a illustrates a cross-sectional view of an exemplary display panel consistent with disclosed embodiments.

FIG. 3a illustrates a cross-sectional view of an exemplary display panel consistent with disclosed embodiments. As shown in FIG. 3a, the display panel may include a first substrate 210, a second substrate 220 arranged opposite to the first substrate 210 and a display element 230 sandwiched between the first substrate 210 and the second substrate 220.

The display element 230 may be any appropriate type of display element, such as plasma display element, field emission display element, liquid crystal display (LCD) element, organic light emitting diode (OLED) display element, light emitting diode (LED) display element, quantum dots (QD) display element or other types of display element. In one embodiment, as shown in FIG. 3a, the display element 230 may be liquid crystal display (LCD) element, i.e., a liquid crystal layer may be sandwiched between the first substrate 210 and the second substrate 220, and the corresponding display panel may be a TFT-LCD.

Figure 3B:
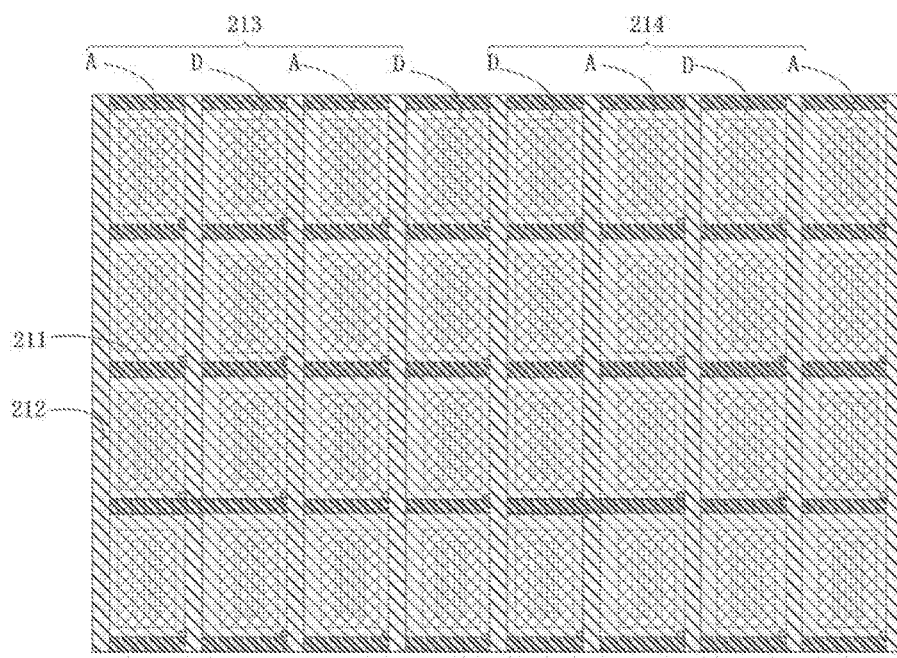
FIG. 3b illustrates a top view of an exemplary first substrate consistent with disclosed embodiments.

FIG. 3b illustrates a top view of an exemplary first substrate in exemplary display panel consistent with disclosed embodiments. As shown in FIG. 3b, the first substrate 210 may include a plurality of scanning lines 211, a plurality of data lines 212 electrically isolated from the scanning lines 211, and a plurality of pixel units. The scanning lines 211 may intersect or cross the data lines 212, defining the plurality of pixel units arranged in an array, i.e., a pixel unit array. The scanning lines 211 may extend in a row direction of the pixel unit array, and the data lines 212 may extend in a column direction of the pixel unit array.

The pixel units may include a plurality of first pixel units A and a plurality of second pixel units D. The pixel unit may be any pixel or sub-pixel unit in the display panel for displaying an image or an image element. In particular, when data signals with a same polarity (i.e., voltages with a same polarity) are applied to the first pixel unit A and the second pixel unit D, the electric field generated within the first pixel unit A and the second pixel unit D may have an inversed or opposite direction.

In one embodiment, each pixel unit may include a thin-film transistor (TFT), a pixel electrode, and a common electrode (not drawn in FIG. 3b). Each TFT may include a gate electrode electrically connected to the scanning line 211, a source electrode electrically connected to the data line 212, and a drain electrode electrically connected to the pixel electrode. Scanning signals may be provided to the scanning lines 211 for switching on/off the TFTs, and data signals may be provided to the data lines 212 for applying a certain voltage to the pixel electrodes. The relative position between the pixel electrode and the common electrode disposed in the first pixel unit A may be opposite to the relative position between the pixel electrode and the common electrode disposed in the second pixel unit D. Thus, when data signals with a same polarity (i.e., voltages with a same polarity) are applied to the first pixel unit A and the second pixel unit D, the electric field generated within the first pixel unit A and the second pixel unit D may have an inversed or opposite direction.

Further, the display panel may include a plurality of first pixel groups 213 and a plurality of second pixel groups 214. The first pixel group 213 may include an equal number of the first pixel units A and the second pixel units D, and the second pixel group 214 may also include an equal number of the first pixel units A and the second pixel units D. In particular, the arrangement of the first pixel units A and the second pixel units D in the first pixel group 213 may be a mirror image of the arrangement of the first pixel units A and the second pixel units D in the second pixel group 214. That is, the first pixel group 213 may be a mirror image of the second pixel group 214.

In one embodiment, the first pixel groups 213 and the second pixel groups 214 may be alternately arranged in an extending direction of the scanning lines 211 (i.e., the row direction of the pixel unit array). In another embodiment, the first pixel groups 213 and the second pixel groups 214 may be alternately arranged in an extending direction of the data lines 212 (i.e., the column direction of the pixel unit array). In another embodiment, the first pixel groups 213 and the second pixel groups 214 may be alternately arranged in both the extending direction of the scanning lines 211 (i.e., the row direction of the pixel unit array) and the extending direction of the data lines 212 (i.e., the column direction of the pixel unit array).

Figure 4:
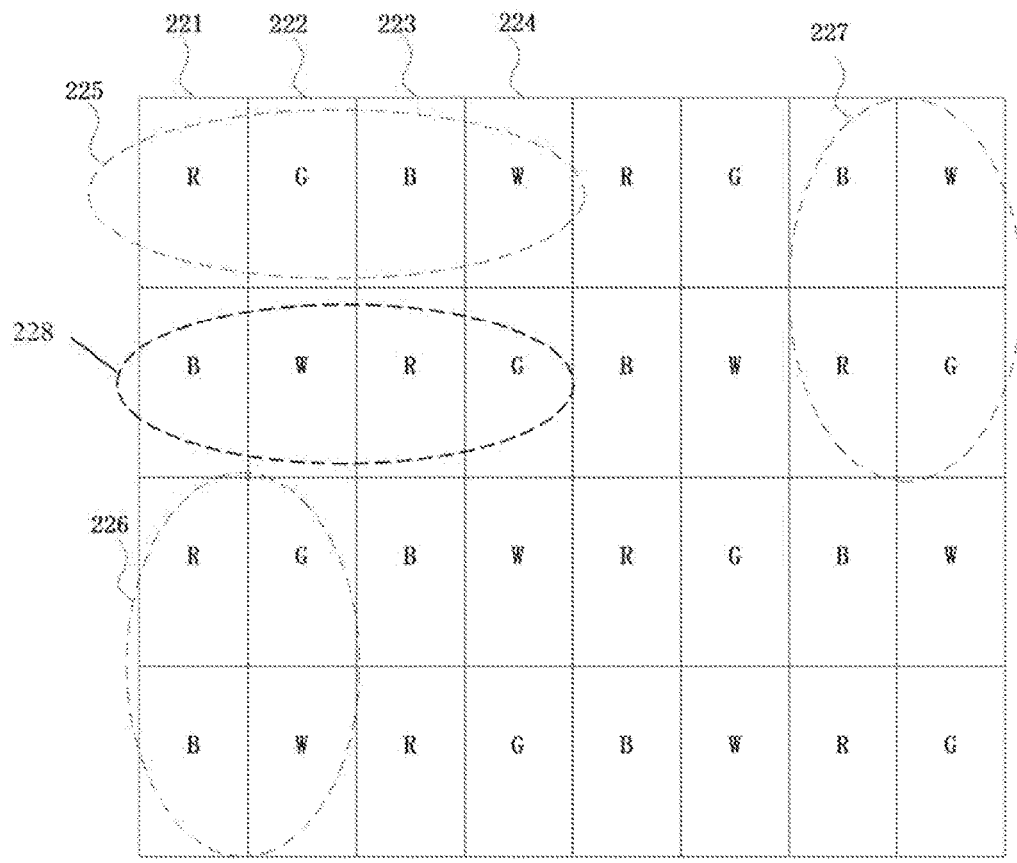
FIG. 4 illustrates a top view of an exemplary second substrate consistent with disclosed embodiments.

FIG. 4 illustrates a top view of an exemplary second substrate in exemplary display panel consistent with disclosed embodiments. The second substrate may include a plurality of color units having a plurality of colors. In one embodiment, as shown in FIG. 4, the first color units 221, a plurality of second color units 222, a plurality of third color units 223, and a plurality of fourth color units 224, which may be corresponding to the plurality of pixel units disposed in the first substrate shown in FIG. 3b to form a plurality of a first color pixel units, a plurality of second color pixel units, a plurality of third color pixel units, and a plurality of fourth color pixel units.

Referring to FIG. 3b and FIG. 4, the plurality of the color units may be arranged in an array, i.e., a color unit array, which may correspond to the pixel unit array in the first substrate shown in FIG. 3a. That is, the extending direction of the scanning lines 211 may be also along a row direction of the color unit array, and the extending direction of the data lines 212 may be also along a column direction of the color unit array. The first color units 221, the second color units 222, the third color units 223, and the fourth color units 224 may be alternately arranged along the extending direction of the scanning lines 211 (i.e., the row direction of the color unit array).

In one embodiment, the first color unit 221, the second color unit 222, the third color unit 223, and the fourth color unit 224 sequentially arranged along the extending direction of the scanning lines 211 (i.e., the row direction of the color unit array) may form a first color group 225. A plurality of first color groups 225 may be repeatedly arranged along the extending direction of the scanning lines 211 (i.e., the row direction of the color unit array).

On the other hand, the third color unit 223, the fourth color unit 224, the first color unit 221, and the second color unit 222 sequentially arranged along the extending direction of the scanning lines 211 (i.e., the row direction of the color unit array) may form a fourth color group 228. A plurality of fourth color groups 228 may be repeatedly arranged along the extending direction of the scanning lines 211 (i.e., the row direction of the color unit array). Along the extending direction of the data lines 212 (i.e., the column direction of the color unit array), the first color groups 225 and the fourth color groups 228 may be alternately arranged.

In another embodiment, along the extending direction of the data lines 212 (i.e., the row direction of the color unit array), the first color unit 211 and the second color unit 222 in one row of the color units (i.e., a color unit row), as well as the third unit 223 and the fourth color unit 224 in the next color unit row may form a second color group 226. A plurality of second color groups 226 may be repeatedly arranged along the extending direction of the data lines 212 (i.e., the column direction of the color unit array).

On the other hand, along the extending direction of the data lines 212 (i.e., the row direction of the color unit array), the third unit 223 and the fourth color unit 224 in one color unit row, as well as the first color unit 211 and the second color unit 222 in the next color unit row may form a third color group 227. A plurality of third color group 227 may be repeatedly arranged along the extending direction of the data lines 212 (i.e., the column direction of the color unit array). Along the extending direction of the scanning lines 211 (i.e., the row direction of the color unit array), the second color groups 226 and the third color groups 227 may be alternately arranged.

In one embodiment, as shown in FIG. 4, the first color unit 221, the second color units 222, the third color units 223, and the fourth color units 224 may be red color units R, green color units G, blue color units B, and white color units W, respectively. In another embodiment, the first color units 221, the second color units 222, the third color units 223, and the fourth color units 224 may be red color units R, green color units G, blue color units B, and orange color units O, respectively. In another embodiment, the first color units 221, the second color units 222, the third color units 223, and the fourth color units 224 may be red color units R, green color units G, blue color units B, and yellow color units Y, respectively.

Referring to FIG. 3a and FIG. 4, a backlight source may be disposed beneath the first substrate 210, and backlight emitted from the backlight source may propagate to the first substrate 210. Through controlling the magnitude and the direction of the electric field within the first pixel units A and/or the second pixel units D, the reorientation of the corresponding LC molecules may be controlled and, in this way, the backlight transmittance of the corresponding pixel units may be modulated.

Once the backlight is transmitted through the pixel units, the corresponding color units may display the corresponding colors, i.e., the first pixel units A and/or the second pixel units D may display the corresponding colors. Thus, each pixel unit may control the color displaying of at least one color unit, i.e., the projection of each pixel unit on the first substrate 210 may overlap with the projection of at least one color unit on the first substrate 210.

In the disclosed embodiments, referring to FIG. 3b and FIG. 4, the plurality of pixel units in the first substrate may be one-to-one corresponding to the plurality of color units in the second substrate. That is, the red color units R, green color units G, blue color units B, and white color units W may be one-to-one corresponding to the plurality of pixel units to form a plurality of red pixel units R, a plurality of green pixel units G, a plurality of blue pixel units B, and a plurality of white pixel units W.

Further, in the second substrate 220, along the extending direction of the scanning lines (i.e., the row direction of the color unit array), the number of the color units may be a positive integer multiple of 4. Thus, in the first substrate 210, when the first pixel groups 213 and the second pixel groups 214 are alternately arranged along the extending direction of the scanning lines, the total number of the first pixel units A and the second pixel units D in each first pixel group 213 may be configured to be a positive integer multiple of 4 and, meanwhile, the total number of the first pixel units A and the second pixel units D in each second pixel group 214 may be configured to be a positive integer multiple of 4.

Because the second substrate 220 includes color units of four different colors and every four color units of different colors may form a color group (i.e., the color group 225, 226, 227, 228), the total number of the pixel units (i.e., the total number of the first pixel units A and the second pixel units D) included in each first pixel group 213, and the total number of the pixel units (i.e., the total number of the first pixel units A and the second pixel units D) included in each second pixel group 214 may be configured to be a positive integer multiple of 4, respectively.

In the disclosed embodiments, the total number of the first pixel units A and the second pixel units D in each first pixel group 213 and the total number of the first pixel units A and the second pixel units D in each second pixel group 214 may be configured to be 4, respectively, which are only for illustrative purposes and are not intended to limit the scope of the present disclosure.

Further, along the extending direction of the scanning lines 211 (i.e., the row direction of the pixel unit array), the first pixel units A and the second pixel units D in the first pixel groups 213 and the second pixel groups 214 may be configured to have various arrangements. In one embodiment, along the extending direction of the scanning lines 211, the first pixel units A and the second pixel units D in each first pixel group 213 and each second pixel group 214 may be alternately arranged. In another embodiment, along the extending direction of the scanning lines 211, every two first pixel units A and every two second pixel units D in each first pixel group 213 and each second pixel group 214 may be alternately arranged.

Figure 5A:
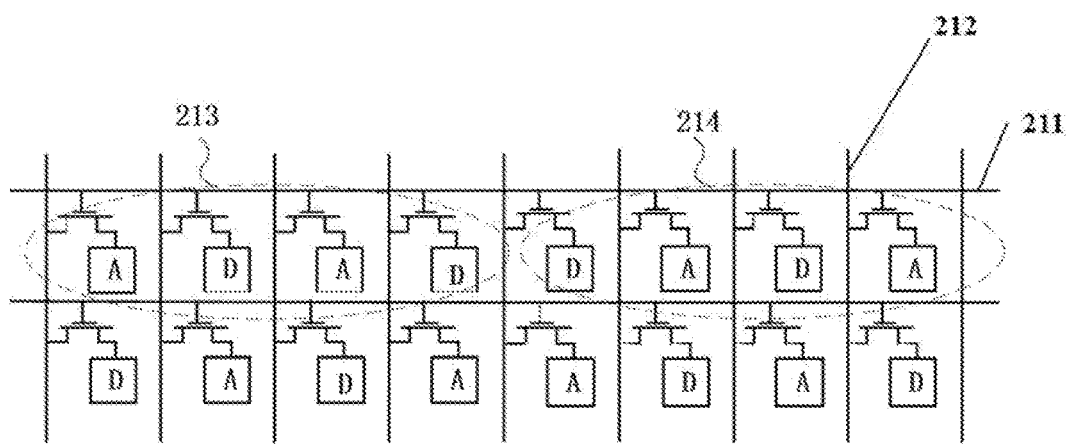
FIG. 5a illustrates an exemplary pixel unit layout in an exemplary first substrate consistent with disclosed embodiments.

FIG. 5a illustrates an exemplary pixel unit layout in an exemplary first substrate consistent with disclosed embodiments. As shown in FIG. 5a, each first pixel group 213 may include two first pixel units A and two second pixel units D, and each second pixel group 214 may include also two first pixel units A and two second pixel units D. Along the extending direction of the scanning lines 211 (i.e., the row direction of the pixel unit row), the first pixel units A and the second pixel units D in each first pixel group 213 and each second pixel group 214 may be alternately arranged.

Referring to FIG. 4, along the extending direction of the scanning lines (i.e., the row direction of the color unit array), the sequentially arranged red color unit R, green color unit G, blue color unit B, and white color unit W may form the first color group 225, and a plurality of first color groups 225 may be repeatedly arranged. On the other hand, along the extending direction of the scanning lines (i.e., the row direction of the color unit array), the sequentially arranged blue color unit B, white color unit W, red color unit R, and green color unit G may form the fourth color group 228, and a plurality of fourth color groups 228 may be repeatedly arranged. Further, the first color groups 225 and the fourth color groups 228 may be alternately arranged along the extending direction of the data lines (i.e., the column direction of the color unit array).

Referring to FIG. 4 and FIG. 5a, in the first color unit row (in the top-to-bottom direction of FIG. 4), along the extending direction of the scanning lines (i.e., the row direction of the color unit array), the odd-numbered first color groups 225 in the second substrate (e.g., counted from the left border of the second substrate) shown in FIG. 4 may correspond to the first pixel groups 213 in the first substrate shown in FIG. 5a, and the even-numbered first color groups 225 in the second substrate (e.g., counted from the most left border of the second substrate) shown in FIG. 4 may correspond to the second pixel groups 214 in the first substrate shown in FIG. 5a.

Further, in the second color unit row (in the top-to-bottom direction of FIG. 4), along the extending direction of the scanning lines (i.e., the row direction of the color unit array), the odd-numbered fourth color groups 228 in the second substrate (e.g., counted from the left border of the second substrate) shown in FIG. 4 may correspond to the second pixel groups 214 in the first substrate shown in FIG. 5a, and the even-numbered fourth color groups 228 in the second substrate (e.g., counted from the left border of the second substrate) shown in FIG. 4 may correspond to the first pixel groups 213 in the first substrate shown in FIG. 5a.

It should be noted that, FIG. 5a only illustrates the arrangement of the first pixel groups 213 and the second pixel groups 214 in the first pixel unit row and the second pixel unit row (in a top-to-bottom direction of FIG. 5a), to which the arrangement of the first pixel groups 213 and the second pixel groups 214 in the subsequent pixel unit rows may be referred.

Further, in one embodiment, as shown in FIG. 5a, the arrangement of the first pixel groups 213 and the second pixel groups 214 in the first pixel unit row may be different from the arrangement of the first pixel groups 213 and the second pixel groups 214 in the second pixel unit row. For example, the first pixel groups 213 and the second pixel groups 214 may be alternately arranged along the column direction of the pixel unit array.

In certain embodiments, the arrangement of the first pixel groups 213 and the second pixel groups 214 in the first pixel unit row may be the same as the arrangement of the first pixel groups 213 and the second pixel groups 214 in the second pixel unit row. That is, the arrangement of the first pixel groups 213 and the second pixel groups 214 in each pixel unit row may be identical.

The display panel shown in FIG. 3a may also include a plurality of source electrode driving units connected to the data lines, inputting data signals for column inversion or frame inversion to the data lines. In the disclosed embodiments, low power data signals for column inversion or frame inversion may be provided to drive the display panel, which are only for illustrative purposes and are not intended to limit the scope of the present disclosure. In another embodiment, data signals for line (or row) inversion may be provided to drive the display panel. In another embodiment, data signals for dot inversion may be provided to drive the display panel.

In the disclosed embodiments, the positive polarity (+) may refer to the electrical field direction from top to bottom, and the negative polarity (−) may refer to the electrical field direction from bottom to top. However, whether the electrical field direction is from the pixel electrodes to the common electrodes or from the common electrodes to the pixel electrodes, may be determined by the voltage difference between the pixel electrodes and the common electrodes.

The positive polarity data signal may indicate the voltage corresponding to the data signal is larger than the voltage applied to the common electrode, i.e., the voltage applied to the pixel electrode may be larger than the voltage applied to the common electrode. The negative polarity data signal may indicate the voltage corresponding to the data signal is smaller than the voltage applied to the common electrode, i.e., the voltage applied to the pixel electrode may be smaller than the voltage applied to the common electrode.

In one embodiment, the display panel may be driven by the frame inversion driving method. Referring to FIG. 5a, when the source electrode driving units provide first image frame data signals with the positive polarity (+) to all the data lines, the first pixel units A may have the positive polarity (+), while the second pixel units D connected to a same data line may have the negative polarity (−), because the relative position of the pixel electrode and the common electrode in the first pixel units A and the second pixel units D may be inverted.

Figure 5B:
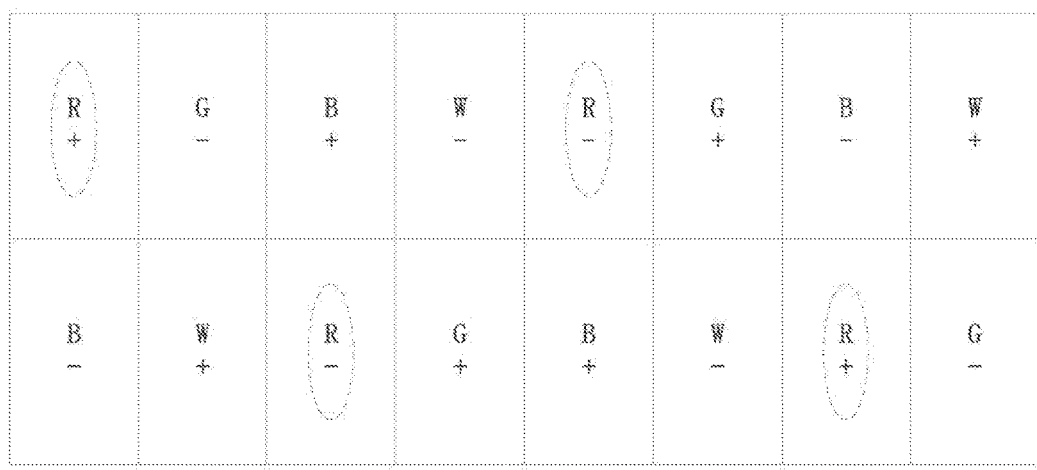
FIG. 5b illustrates an exemplary pixel unit voltage polarity distribution of a first image frame according to a frame inversion driving method consistent with disclosed embodiments.

The corresponding pixel unit voltage polarity distribution may be referred to FIG. 5b. FIG. 5b illustrates a pixel unit voltage polarity distribution of a first image frame according to a frame inversion driving method for an exemplary display panel with an exemplary pixel unit layout in FIG. 5a consistent with disclosed embodiments. As shown in FIG. 5b, the voltages applied to the adjacent color pixel units with a same color in a same pixel unit row may have a reversed polarity.

For example, in the upper row, the red pixel unit R corresponding to the first pixel unit A shown in FIG. 5a may have the positive polarity (+), while the next red pixel unit R corresponding to the second pixel unit D shown in FIG. 5a may have the negative polarity (−). In the lower row, the red pixel unit R corresponding to the first pixel unit A shown in FIG. 5a may have the negative polarity (−), while the next red pixel unit R corresponding to the second pixel unit D shown in FIG. 5a may have the positive polarity (+).

In the display panel driven by the frame inversion driving method, referring to FIG. 5a, when the source electrode driving units provide second image frame data signals with the negative polarity (−) to all the data lines, the first pixel units A may have the negative polarity (−), while the second pixel units D connected to a same data line may have the positive polarity (+), because the relative position of the pixel electrode and the common electrode in the first pixel units A and the second pixel units D may be inverted.

Figure 5C:
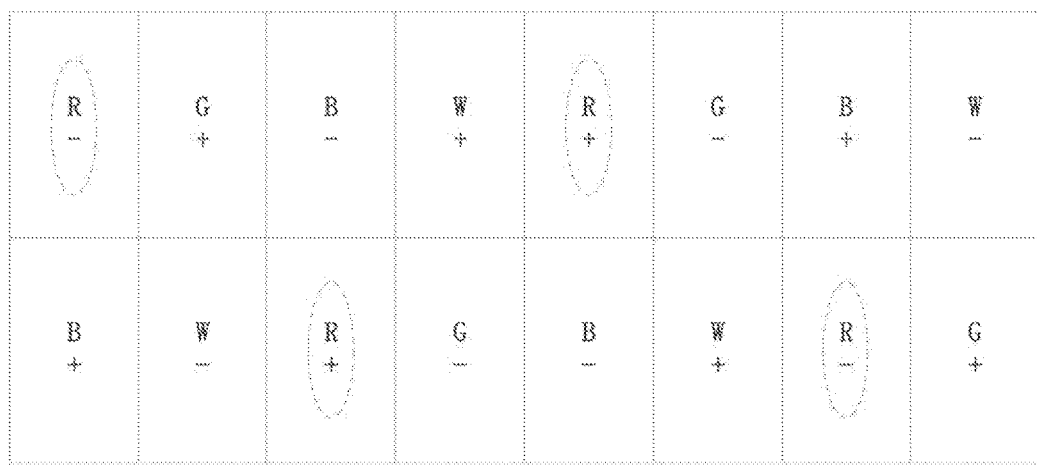
FIG. 5c illustrates an exemplary pixel unit voltage polarity distribution of a second image frame according to a frame inversion driving method consistent with disclosed embodiments.

The corresponding pixel unit voltage polarity distribution may be referred to FIG. 5c. FIG. 5c illustrates a pixel unit voltage polarity distribution of a second image frame according to a frame inversion driving method for an exemplary display panel with an exemplary pixel unit layout in FIG. 5a consistent with disclosed embodiments. As shown in FIG. 5c the voltages applied to the adjacent color pixel units with a same color in a same pixel unit row may have a reversed polarity.

For example, in the upper row, the red pixel unit R corresponding to the first pixel unit A shown in FIG. 5a may have the negative polarity (−), while the next red pixel unit R corresponding to the second pixel unit D shown in FIG. 5a may have the positive polarity (+). In the lower row, the red pixel unit R corresponding to the first pixel unit A shown in FIG. 5a may have the positive polarity (+), while the next red pixel unit R corresponding to the second pixel unit D shown in FIG. 5a may have the negative polarity (−). Further, in the first image frame and the second image frame, the voltage applied to the same pixel units may have a reversed polarity.

Thus, from the first image frame to the second image frame, the adjacent color pixel units with the same color in a same color unit row may correspond to the pixel units with the reversed polarity, and the color units with the same color in a same color unit row may correspond to an equal number of positive polarity pixel units and negative polarity pixel units. For example, as shown in FIG. 5b, the red color units in the upper color unit row may correspond to an equal number of positive polarity pixel units and negative polarity pixel units, i.e., one positive polarity pixel unit and one negative polarity pixel unit. Similarly, the red color units in the lower color unit row may correspond to an equal number of positive polarity pixel units and negative polarity pixel units, i.e., one positive polarity pixel unit and one negative polarity pixel unit.

In another embodiment, the display panel maybe driven by the column inversion driving method. Referring to FIG. 5a, when the source electrode driving units provide the data signals of the first image frame to all the data lines, the positive polarity (+) data signals may be provided to the odd-numbered data lines (e.g., counted from the left border of the first substrate), and the negative polarity (−) data signals may be provided to the even-numbered data lines (e.g., counted from the left border of the first substrate). Thus, the first pixel units A connected to the odd-numbered data line may have the positive polarity, while the second pixel units D connected to a same odd-numbered data line may have the negative polarity. The first pixel units A connected to the even-numbered data line may have the negative polarity, while the second pixel units D connected to a same even-numbered data line may have the positive polarity.

Figure 5D:
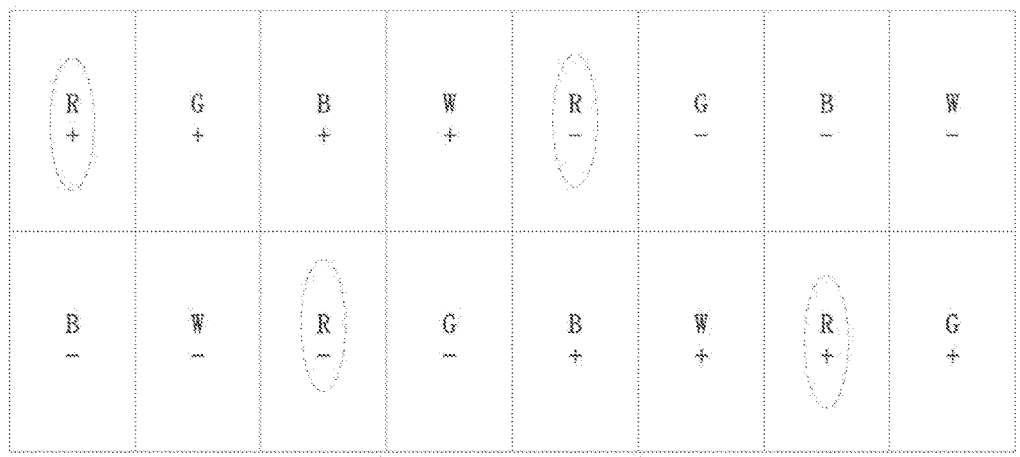
FIG. 5d illustrates an exemplary pixel unit voltage polarity distribution of a first image frame according to a column inversion driving method consistent with disclosed embodiments.

The corresponding pixel unit voltage polarity distribution may be referred to FIG. 5d. FIG. 5d illustrates a pixel unit voltage polarity distribution of a first image frame according to a column inversion driving method for an exemplary display panel with an exemplary pixel unit layout in FIG. 5a consistent with disclosed embodiments. As shown in FIG. 5d, the voltages applied to the adjacent color pixel units with a same color in a same pixel unit row may have a reversed polarity.

For example, in the upper row, the red pixel unit R corresponding to the first pixel unit A shown in FIG. 5a may have the positive polarity (+), while the next red pixel unit R corresponding to the second pixel unit D shown in FIG. 5a may have the negative polarity (−). In the lower row, the red pixel unit R corresponding to the first pixel unit A shown in FIG. 5a may have the negative polarity (−), while the next red pixel unit R corresponding to the second pixel unit D shown in FIG. 5a may have the positive polarity (+).

In the display panel driven by the column inversion driving method, referring to FIG. 5a, when the source electrode driving units provide the data signals of the second image frame to all the data lines, the positive polarity (+) data signals may be provided to the even-numbered data lines, and the negative polarity (−) data signals may be provided to the odd-numbered data lines. Thus, all the pixel units in the second image frame may have a reversed polarity compared to the pixel units in the first image frame. That is, the first pixel units A connected to the odd-numbered data line may have the negative polarity, while the second pixel units D connected to a same odd-numbered data line may have the positive polarity. The first pixel units A connected to the even-numbered data line may have the positive polarity, while the second pixel units D connected to a same even-numbered data line may have the negative polarity.

Figure 5E:
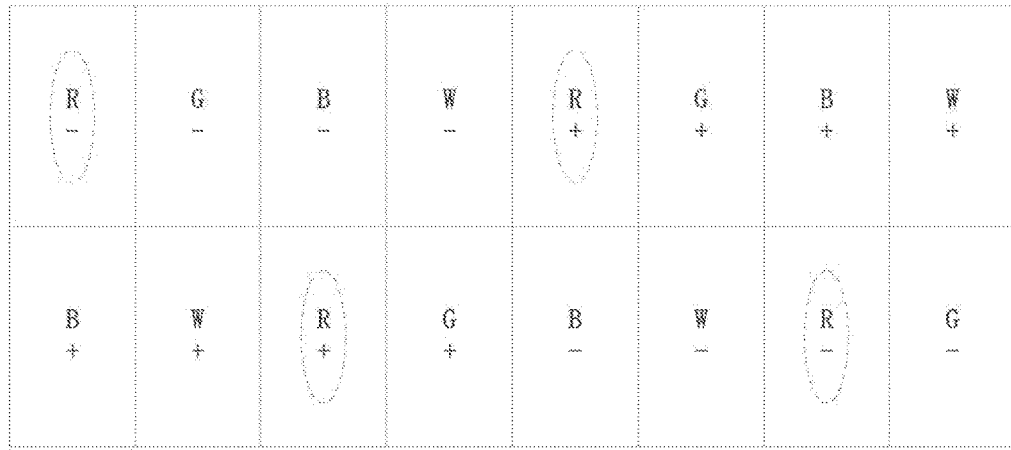
FIG. 5e illustrates an exemplary pixel unit voltage polarity distribution of a second image frame according to a column inversion driving method consistent with disclosed embodiments.

The corresponding pixel unit voltage polarity distribution may be referred to FIG. 5e. FIG. 5e illustrates a pixel unit voltage polarity distribution of a second image frame according to a column inversion driving method for an exemplary display panel with an exemplary pixel unit layout in FIG. 5a consistent with disclosed embodiments. As shown in FIG. 5e, the voltages applied to the adjacent color pixel units with a same color in a same pixel unit row may have a reversed polarity.

For example, in the upper row, the red pixel unit R corresponding to the first pixel unit A shown in FIG. 5a may have the negative polarity (−), while the next red pixel unit R corresponding to the second pixel unit D shown in FIG. 5a may have the positive polarity (+). In the lower row, the red pixel unit R corresponding to the first pixel unit A shown in FIG. 5a may have the positive polarity (+), while the next red pixel unit R corresponding to the second pixel unit D shown in FIG. 5a may have the negative polarity (−). Further, the voltage applied to the same pixel unit may have a revered polarity.

Thus, from the first image frame to the second image frame, the adjacent color units with the same color in a same color unit row may correspond to the pixel units with the reversed polarity, and the color units with the same color in a same color unit row may correspond to an equal number of positive polarity pixel units and negative polarity pixel units. For example, as shown in FIG. 5d, the red color units in the upper color unit row may correspond to an equal number of positive polarity pixel units and negative polarity pixel units, i.e., one positive polarity pixel unit and one negative polarity pixel unit. Similarly, the red color units in the lower color unit row may correspond to an equal number of positive polarity pixel units and negative polarity pixel units, i.e., one positive polarity pixel unit and one negative polarity pixel unit.

Figure 6A:
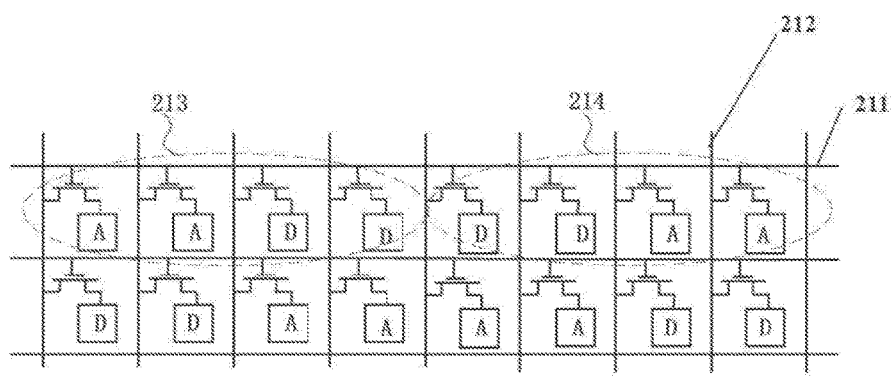
FIG. 6a illustrates another exemplary pixel unit layout in an exemplary first substrate consistent with disclosed embodiments.

FIG. 6a illustrates another exemplary pixel unit layout in an exemplary first substrate consistent with disclosed embodiments. As shown in FIG. 6a, each first pixel group 213 may include two first pixel units A and two second pixel units D, and each second pixel group 214 may include also two first pixel units A and two second pixel units D. Along the extending direction of the scanning lines 211 (i.e., the row direction of the pixel unit row), in each first pixel group 213 and each second pixel group 214, every two first pixel units A and every two second pixel units D may be alternately arranged.

Referring to FIG. 4, in the first color unit row (in a top-to-bottom direction of FIG. 4), along the extending direction of the scanning lines 211 (e.g., the row direction of the color unit row), the odd-numbered first color groups 225 in the second substrate (counted from the left border of the second substrate) shown in FIG. 4 may correspond to the first pixel groups 213 in the first substrate shown in FIG. 6a, and the even-numbered first color groups 225 (counted from the left border of the second substrate) shown in FIG. 4 in the second substrate may correspond to the second pixel groups 214 in the first substrate shown in FIG. 6a.

Further, in the second color unit row (in the top-to-bottom direction of FIG. 4), along the extending direction of the scanning lines 211 (e.g., the row direction of the color unit row), the odd-numbered fourth color groups 228 in the second substrate (counted from the left border of the second substrate) shown in FIG. 4 may correspond to the second pixel groups 214 in the first substrate shown in FIG. 6a, and the even-numbered fourth color groups 228 in the second substrate (counted from the left border of the second substrate) shown in FIG. 4 may correspond to the first pixel groups 213 in the first substrate shown in FIG. 6a.

It should be noted that, FIG. 6a only illustrates the arrangement of the first pixel groups 213 and the second pixel groups 214 in the first pixel unit row and the second pixel unit row, to which the arrangement of the first pixel groups 213 and the second pixel groups 214 in the subsequent pixel unit rows may be referred. Further, in the disclosed embodiments, the arrangement of the first pixel groups 213 and the second pixel groups 214 in the first pixel unit row may be different from the arrangement of the first pixel groups 213 and the second pixel groups 214 in the second pixel unit. For example, the first pixel groups 213 and the second pixel groups 214 may be alternately arranged along the extending direction of the data lines 212.

In certain embodiments, the arrangement of the first pixel groups 213 and the second pixel groups 214 in the first pixel unit row may be the same as the arrangement of the first pixel groups 213 and the second pixel groups 214 in the second pixel unit. That is, the first pixel groups 213 and the second pixel groups 214 may be not alternately arranged along the extending direction of the data lines 212.

In one embodiment, the display panel maybe driven by the column inversion driving method. Referring to FIG. 6a, when the source electrode driving units provide the data signals of the first image frame to all the data lines, the positive polarity (+) data signals may be provided to the odd-numbered data lines (e.g., counted from the left border of the first substrate), and the negative polarity (−) data signals may be provided to the even-numbered data lines (e.g., counted from the left border of the first substrate). Thus, the first pixel units A connected to the odd-numbered data line may have the positive polarity, while the second pixel units D connected to a same odd-numbered data line may have the negative polarity. The first pixel units A connected to the even-numbered data line may have the negative polarity, while the second pixel units D connected to a same even-numbered data line may have the positive polarity.

Figure 6B:
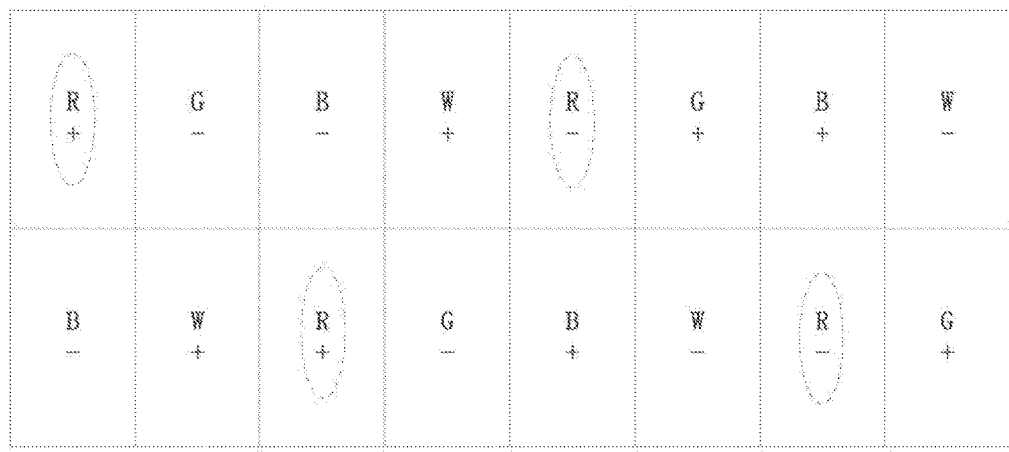
FIG. 6b illustrates another exemplary pixel unit voltage polarity distribution of a first image frame according to a column inversion driving method consistent with disclosed embodiments.

The corresponding pixel unit voltage polarity distribution may be referred to FIG. 6b. FIG. 6b illustrates a pixel unit voltage polarity distribution of a first image frame according to a column inversion driving method for an exemplary display panel with another exemplary pixel unit layout in FIG. 6a consistent with disclosed embodiments. As shown in FIG. 6b, the voltages applied to the adjacent color pixel units with a same color in a same pixel unit row may have a reversed polarity.

For example, in the upper row, the red pixel unit R corresponding to the first pixel unit A shown in FIG. 6a may have the positive polarity (+), while the next red pixel unit R corresponding to the second pixel unit D shown in FIG. 6a may have the negative polarity (−). In the lower row, the red pixel unit R corresponding to the first pixel unit A shown in FIG. 5a may have the positive polarity (+), while the next red pixel unit R corresponding to the second pixel unit D shown in FIG. 6a may have the negative polarity (−).

In the display panel driven by the column inversion driving method, referring to FIG. 6a, when the source electrode driving units provide the data signals of the second image frame to all the data lines, the positive polarity (+) data signals may be provided to the even-numbered data lines, and the negative polarity (−) data signals may be provided to the odd-numbered data lines. Thus, all the pixel units in the second image frame may have a reversed polarity compared to the pixel units in the first image frame. That is, the first pixel units A connected to the odd-numbered data line may have the negative polarity, while the second pixel units D connected to a same odd-numbered data line may have the positive polarity. The first pixel units A connected to the even-numbered data line may have the positive polarity, while the second pixel units D connected to a same even-numbered data line may have the negative polarity.

Figure 6C:
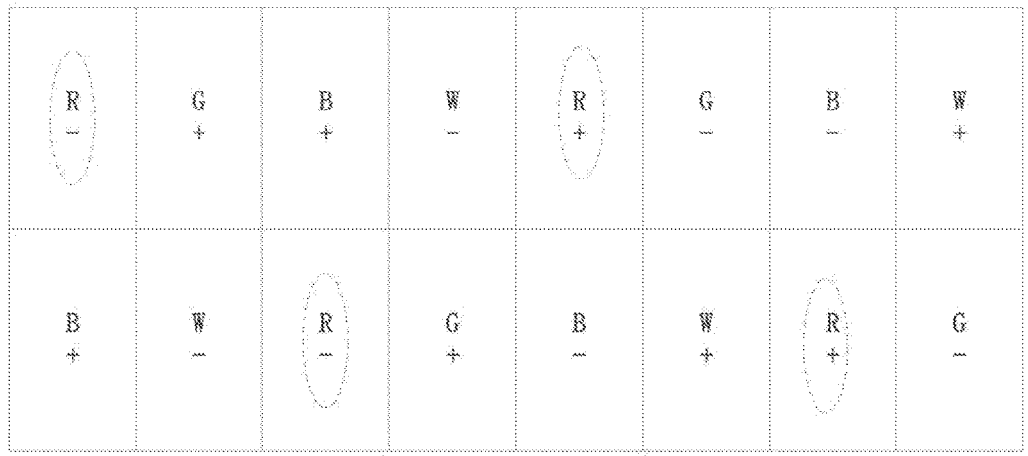
FIG. 6c illustrates an exemplary pixel unit voltage polarity distribution of a second image frame according to a column inversion driving method consistent with disclosed embodiments.

The corresponding pixel unit voltage polarity distribution may be referred to FIG. 6c. FIG. 6c illustrates a pixel unit voltage polarity distribution of a second image frame according to a column inversion driving method for an exemplary display panel with an exemplary pixel unit layout in FIG. 6a consistent with disclosed embodiments. As shown in FIG. 6c, the voltages applied to the adjacent color pixel units with a same color in a same pixel unit row may have a reversed polarity.

For example, in the upper row, the red pixel unit R corresponding to the first pixel unit A shown in FIG. 6a may have the negative polarity (−), while the next red pixel unit R corresponding to the second pixel unit D shown in FIG. 6a may have the positive polarity (+). In the lower row, the red pixel unit R corresponding to the first pixel unit A shown in FIG. 6a may have the negative polarity (−), while the next red pixel unit R corresponding to the second pixel unit D shown in FIG. 6a may have the positive polarity (+). Further, the voltage applied to the same pixel unit may have a revered polarity.

Thus, from the first image frame to the second image frame, the adjacent color units with the same color in a same color unit row may correspond to the pixel units with the reversed polarity, and the color units with the same color in a same color unit row may correspond to an equal number of positive polarity pixel units and negative polarity pixel units. For example, as shown in FIG. 6b, the red color units in the upper color unit row may correspond to an equal number of positive polarity pixel units and negative polarity pixel units, i.e., one positive polarity pixel unit and one negative polarity pixel unit. Similarly, the red color units in the lower color unit row may correspond to an equal number of positive polarity pixel units and negative polarity pixel units, i.e., one positive polarity pixel unit and one negative polarity pixel unit.

Similarly, the pixel unit voltage polarity distribution according to a frame inversion driving method may also be illustrated. In another embodiment, the display panel may be driven by the frame inversion driving method. Referring to FIG. 6a, when the source electrode driving units provide first image frame data signals with the positive polarity (+) to all the data lines, the first pixel units A may have the positive polarity (+), while the second pixel units D connected to a same data line may have the negative polarity (−), because the relative position of the pixel electrode and the common electrode in the first pixel units A and the second pixel units D may be inverted.

Figure 6D:
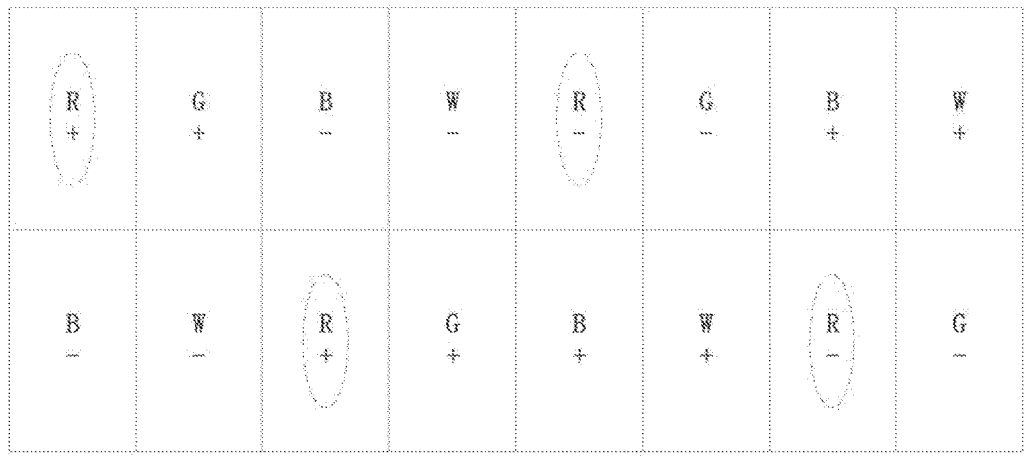
FIG. 6d illustrates an exemplary pixel unit voltage polarity distribution of a first image frame according to a frame inversion driving method consistent with disclosed embodiments.

The corresponding pixel unit voltage polarity distribution may be referred to FIG. 6d. FIG. 6d illustrates a pixel unit voltage polarity distribution of a first image frame according to a frame inversion driving method for an exemplary display panel with an exemplary pixel unit layout in FIG. 6a consistent with disclosed embodiments. As shown in FIG. 6d, the voltages applied to the adjacent color pixel units with a same color in a same pixel unit row may have a reversed polarity.

For example, in the upper row, the red pixel unit R corresponding to the first pixel unit A shown in FIG. 6a may have the positive polarity (+), while the next red pixel unit R corresponding to the second pixel unit D shown in FIG. 6a may have the negative polarity (−). In the lower row, the red pixel unit R corresponding to the first pixel unit A shown in FIG. 5a may have the positive polarity (+), while the next red pixel unit R corresponding to the second pixel unit D shown in FIG. 6a may have the negative polarity (−).

In the display panel driven by the frame inversion driving method, referring to FIG. 6a, when the source electrode driving units provide second image frame data signals with the negative polarity (−) to all the data lines, the first pixel units A may have the negative polarity (−), while the second pixel units D connected to a same data line may have the positive polarity (+), because the relative position of the pixel electrode and the common electrode in the first pixel units A and the second pixel units D may be inverted.

Figure 6E:
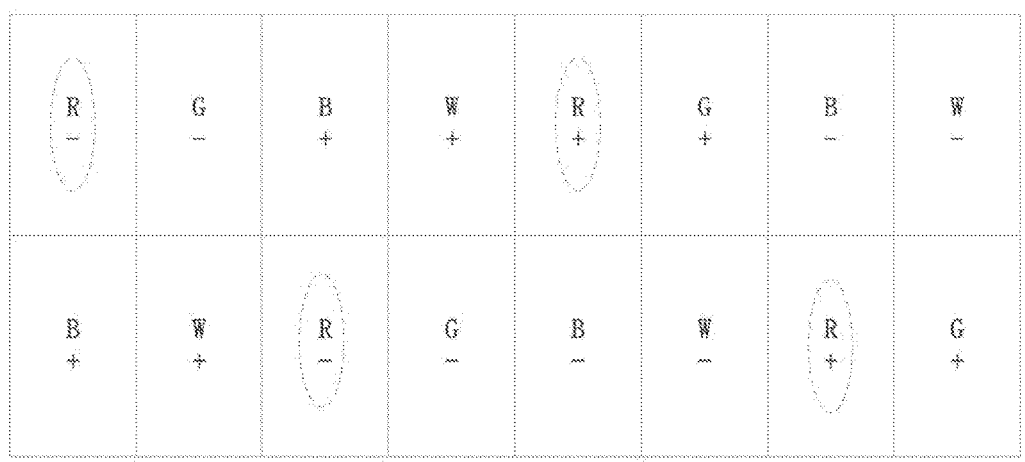
FIG. 6e illustrates an exemplary a pixel unit voltage polarity distribution of a second image frame according to a frame inversion driving method a consistent with disclosed embodiments.

The corresponding pixel unit voltage polarity distribution may be referred to FIG. 6e. FIG. 6e illustrates a pixel unit voltage polarity distribution of a second image frame according to a frame inversion driving method for an exemplary display panel with an exemplary pixel unit layout in FIG. 6a consistent with disclosed embodiments. As shown in FIG. 6e, the voltages applied to the adjacent color pixel units with a same color in a same pixel unit row may have a reversed polarity.

For example, in the upper row, the red pixel unit R corresponding to the first pixel unit A shown in FIG. 6a may have the negative polarity (−), while the next red pixel unit R corresponding to the second pixel unit D shown in FIG. 6a may have the positive polarity (+). In the lower row, the red pixel unit R corresponding to the first pixel unit A shown in FIG. 6a may have the negative polarity (−), while the next red pixel unit R corresponding to the second pixel unit D shown in FIG. 6a may have the positive polarity (+). Further, the voltage applied to the same pixel unit may have a revered polarity.

Thus, from the first image frame to the second image frame, the adjacent color units with the same color in a same color unit row may correspond to the pixel units with the reversed polarity, and the color units with the same color in a same color unit row may correspond to an equal number of positive polarity pixel units and negative polarity pixel units. For example, as shown in FIG. 6d, the red color units in the upper color unit row may correspond to an equal number of positive polarity pixel units and negative polarity pixel units, i.e., one positive polarity pixel unit and one negative polarity pixel unit. Similarly, the red color units R in the lower color unit row may correspond to an equal number of positive polarity pixel units and negative polarity pixel units, i.e., one positive polarity pixel unit and one negative polarity pixel unit.

In the disclosed embodiments, the adjacent color units with the same color in a same color unit row may be configured to correspond to the pixel units within which the direction of the electric filed is inverted. That is, the adjacent color units with the same color in a same color unit row may correspond to the pixel units with the reversed polarity. In addition, the color units with the same color in a same color unit row may correspond to an equal number of positive polarity pixel units and negative polarity pixel units. The image flickering, caused by the color units with the same color in a same color unit row corresponding to the pixel units with the same polarity, may be minimized, because the flickering in the adjacent color units with the same color in a same color unit row may be cancelled out. Accordingly, the image quality may be enhanced.

Figure 7A:
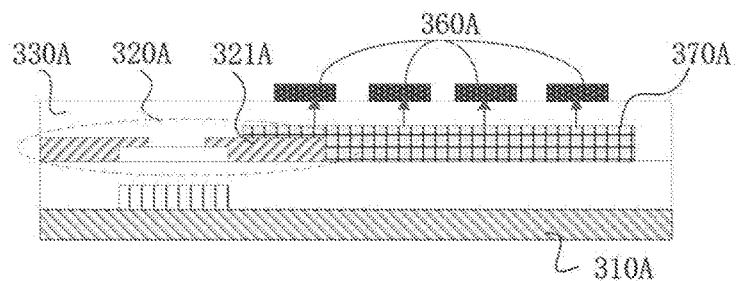
FIG. 7a illustrates a cross-sectional view of an exemplary first pixel unit consistent with disclosed embodiments.

FIG. 7a illustrates a cross-sectional view of an exemplary first pixel unit in an exemplary display panel consistent with disclosed embodiments. As shown in FIG. 7a, the first pixel unit may include a base substrate 310A (e.g., a glass base substrate), a thin-film transistor (TFT) 320A, a pixel electrode 370A, a passivation layer 330A, and a common electrode 360A. In particular, the TFT 320A may include a drain electrode 321A electrically connected to the pixel electrode 370A. The passivation layer 330A may be disposed on the TFT 320A and the pixel electrode 370A. The common electrode 360A may be disposed on the passivation layer 330A.

Figure 7B:
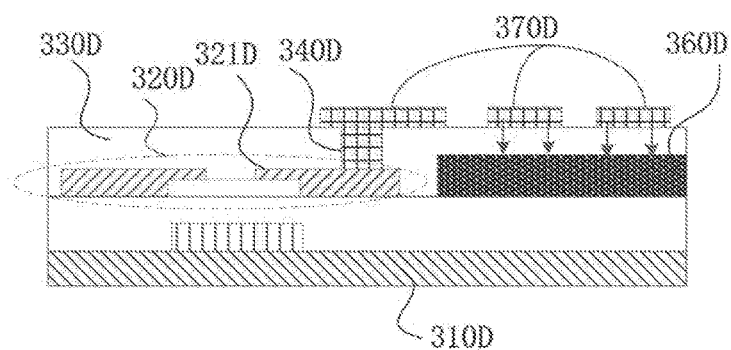
FIG. 7b illustrates a cross-sectional view of an exemplary second pixel unit consistent with disclosed embodiments.

FIG. 7b illustrates a cross-sectional view of an exemplary second pixel unit in an exemplary display panel consistent with disclosed embodiments. As shown in FIG. 7b, the first pixel unit may include a base substrate 310D (e.g., a glass base substrate), a thin-film transistor (TFT) 320D, a pixel electrode 370D, a passivation layer 330D, and a common electrode 360D. In particular, the TFT 320D may include a drain electrode 321D electrically connected to the common electrode 360D. The passivation layer 330D may be disposed on the TFT 320D and the common electrode 360D, and the passivation layer 330D may include at least one through-hole 340D, which may be electrically conductive. The pixel electrode 370D may be disposed on the passivation layer 330D, and may be electrically connected to the drain electrode 321D through the through-hole 340D in the passivation layer 330D.

Referring to FIG. 7a and FIG. 7b, in the first pixel unit, the pixel electrode 370A and the common electrode 360A may be disposed on the surface of the first substrata facing the second substrate, and the common electrode 360A may be disposed closer to the second substrate than the pixel electrode 370A. Meanwhile, in the second pixel unit, the pixel electrode 370D and the common electrode 360D may also be disposed on the surface of the first substrata facing the second substrate, and the pixel electrode 370D may be disposed closer to the second substrate than the common electrode 360D.

In certain embodiments, in the first pixel unit, the pixel electrode 370A may be disposed closer to the second substrate than the common electrode 360A, while in the second pixel unit, the common electrode 360D may be disposed closer to the second substrate than the pixel electrode 370D.

In the disclosed embodiments, in the first pixel unit, the common electrode 360A may be disposed closer to the second substrate than the pixel electrode 370A, i.e., the pixel electrode 370A may be disposed beneath the common electrode 360A. In the second pixel unit, the pixel electrode 370D may be disposed closer to the second substrate than the common electrode 360D, i.e., the common electrode 360D may be disposed beneath the pixel electrode 370D.

Thus, when the data signals with the same polarity are provided to the pixel electrode 370A of the first pixel unit and the pixel electrode 370D of the second pixel unit, and the data signals with the same polarity are provided to the common electrode 360A of the first pixel unit and the common electrode 360D of the second pixel unit, the electric fields generated within the first pixel unit and the second pixel unit may have a reversed direction. For example, as shown in FIG. 7a and FIG. 7b, the direction of the electric field within the first pixel unit and the second pixel unit may be indicated by the arrows. The electric field within the first pixel unit may be along a bottom-to-top direction in FIG. 7a, while the electric field within the second pixel unit may be along a top-to-bottom direction in FIG. 7b.

Referring to FIG. 7a, when the pixel electrode 370A is disposed beneath the common electrode 360A in the first pixel unit, the common electrode 360A may include a plurality of sub-electrodes, and the pixel electrode 370A may be a continuous electrode or may include a plurality of sub-electrodes. For example, as shown in FIG. 7a, the common electrode 360A may include four sub-electrodes. The shape of the common electrode 360A, the number of the sub-electrodes include in the common electrode 360A, and the shape of the pixel electrode 360A shown in FIG. 7a are only for illustrative purposes, and are not intended to limit the scope of the present disclosure.

Referring to FIG. 7b, when the common electrode 360D may be disposed beneath the pixel electrode 370D, the pixel electrode 370D may include a plurality of sub-electrodes, and the common electrode 370D may be a continuous electrode or may include a plurality of sub-electrodes. For example, as shown in FIG. 7b, the pixel electrode 370D may include three sub-electrodes. The shape of the pixel electrode 370D, the number of the sub-electrodes include in the pixel electrode 370D, and the shape of the common electrode 370D shown in FIG. 7b are only for illustrative purposes, and are not intended to limit the scope of the present disclosure.

In the disclosed embodiments, in two adjacent first pixel units or two adjacent second pixel units, the relative position between the pixel electrode and the common electrode may be the same. Thus, the common electrodes in the two adjacent first pixel units or two adjacent second pixel units may be directly electrically connected.

However, in the adjacent first pixel unit and the second pixel unit, the relative position between the pixel electrode and the common electrode may be reversed. Thus, the common electrodes in the adjacent first pixel unit and second pixel unit may not be directly electrically connected.

That is, there may be a gap between the common electrode in the first pixel unit and the common electrode in the adjacent second pixel unit. However, the common electrode in the first pixel unit may be electrically connected to the common electrode in the adjacent second pixel unit through at least one through-hole in a passivation layer.

Figure 7C:
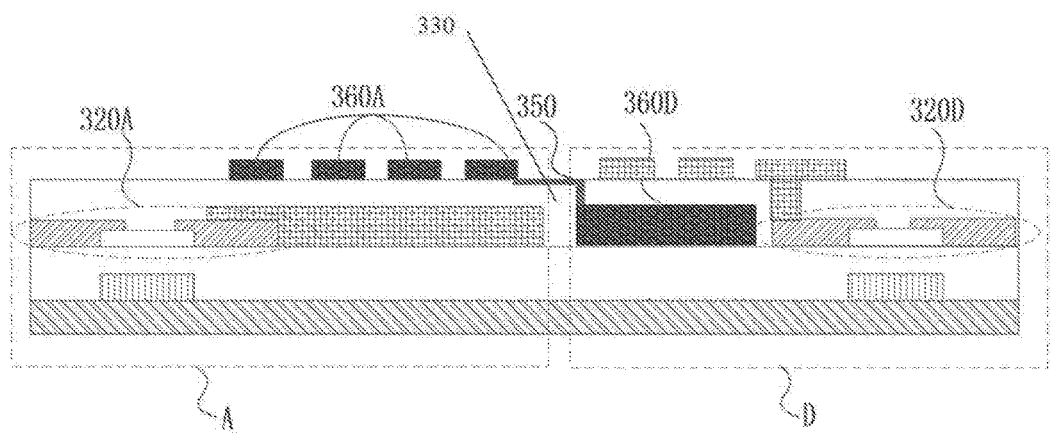
FIG. 7c illustrates a cross-sectional view of an exemplary first pixel unit and an exemplary adjacent second pixel unit consistent with disclosed embodiments.

FIG. 7c illustrates a cross-sectional view of exemplary adjacent first pixel unit and second pixel unit in an exemplary display panel consistent with disclosed embodiments. As shown in FIG. 7c, in the adjacent first pixel unit A and second pixel unit D, a passivation layer 330 may be disposed between the common electrode 360A in the first pixel unit A and the common electrode 360D in the adjacent second pixel unit D, and the passivation layer 330 may be disposed with at least one through-hole 350, which may be electrically conductive. The common electrode 360A in the first pixel unit A may be electrically connected to the common electrode 360D in the adjacent second pixel unit D through the through-hole 350 in the passivation layer 330.

Further, the first pixel unit A and the adjacent second pixel unit D units may be arranged bilaterally symmetrically. For example, as shown in FIG. 7c, in the first pixel unit A, the common electrode 360A and the pixel electrode 370A may be disposed close to the right border of the first pixel unit, and the TFT 320A may be disposed close to the left border of the first pixel unit. In the adjacent second pixel unit D, the common electrode 360D and the pixel electrode 370D may be disposed close to the left border of the second pixel unit, and the TFT 320D may be disposed close to the right border of the second pixel unit. Thus, the common electrode 360A in the first pixel unit A may be electrically connected to the common electrode 360D in the adjacent second pixel unit D through the through-hole 350.

In certain embodiments, the common electrode and the pixel electrode in the first pixel unit may be disposed in a same layer, and the common electrode and the pixel electrode in the second pixel unit may also be disposed in a same layer.

Figure 7D:
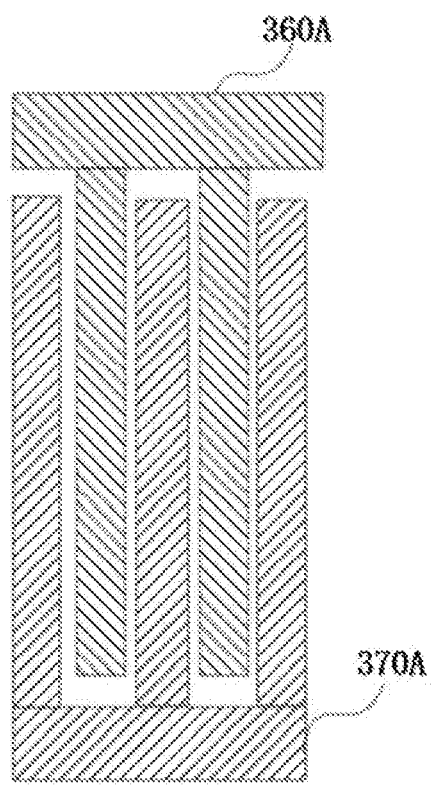
FIG. 7d illustrates a top view of an exemplary pixel electrode and an exemplary common electrode in an exemplary first pixel unit consistent with disclosed embodiments.

FIG. 7d illustrates a top view of exemplary pixel electrode and common electrode in an exemplary first pixel unit consistent with disclosed embodiments. The common electrode 360A and the pixel electrode 370A may include a plurality of stripe-shaped sub-electrodes, respectively. In one embodiment, as shown in FIG. 7d, the common electrode 360A may include two stripe-shaped sub-electrodes, and the pixel electrode 370A may include three stripe-shaped sub-electrodes.

Figure 7E:
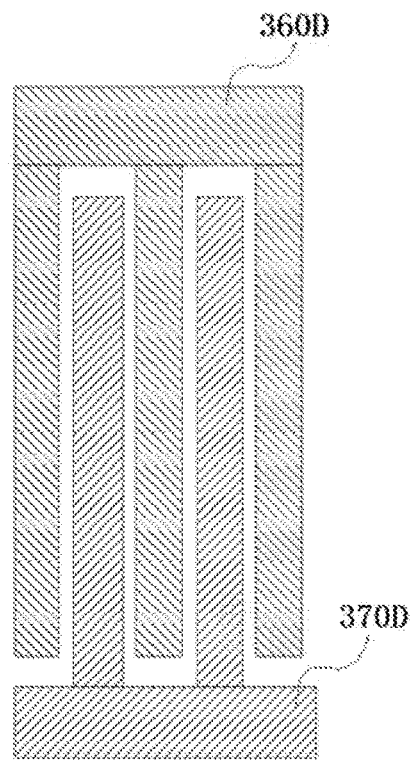
FIG. 7e illustrates a top view of an exemplary pixel electrode and an exemplary common electrode in an exemplary second pixel unit consistent with disclosed embodiments.

FIG. 7e illustrates a top view of exemplary pixel electrode and common electrode in an exemplary second pixel unit consistent with disclosed embodiments. The common electrode 360D and the pixel electrode 370D may include a plurality of stripe-shaped sub-electrodes, respectively. In one embodiment, as shown in FIG. 7e, the common electrode 360D may include two stripe-shaped sub-electrodes, and the pixel electrode 370D may include three stripe-shaped sub-electrodes.

Referring to FIGS. 7d-7e, along an orientation direction of the pixel electrode and the common electrode, the arrangement of the common electrode 360A and the pixel electrode 370A in the first pixel unit may be opposite to the arrangement of the common electrode 360D and the pixel electrode 370D in the second pixel unit. Thus, when data signals with the same polarity are provided to the first pixel unit and the second pixel unit, the electric field generated within the first pixel unit and the second pixel unit may have an inverted direction.

For example, as shown in FIG. 7d, along the orientation direction of the pixel electrode and the common electrode (e.g., a left-to-right direction in FIG. 7d), the sequentially arranged sub-electrodes may be the pixel electrode 370A, the common electrode 360A, the pixel electrode 370A, the common electrode 360A, and the pixel electrode 370A. The electric field generated with the first pixel unit may have a direction from the pixel electrode 370A to the common electrode 360A.

As a comparison, as shown in FIG. 7e, along the orientation direction of the pixel electrode and the common electrode (e.g., a left-to-right direction in FIG. 7e), the sequentially arranged sub-electrodes may be the common electrode 360D, the pixel electrode 370D, the common electrode 360D, the pixel electrode 370D, and the common electrode 360D. The electric field generated with the first pixel unit may have a direction from the pixel electrode 370D to the common electrode 360D.

It should be noted that, the common electrodes and the pixel electrodes shown in FIGS. 7d-7e only for illustrative purposes, and are not intended to limit the scope of the present disclosure. The shape of the common electrode, the number of the sub-electrodes included in the common electrode, the shape of the pixel electrode, the number of the sub-electrodes included in the pixel electrode, and the shape of the sub-electrodes may vary according to different fabrication process and application scenarios.

Figure 8:
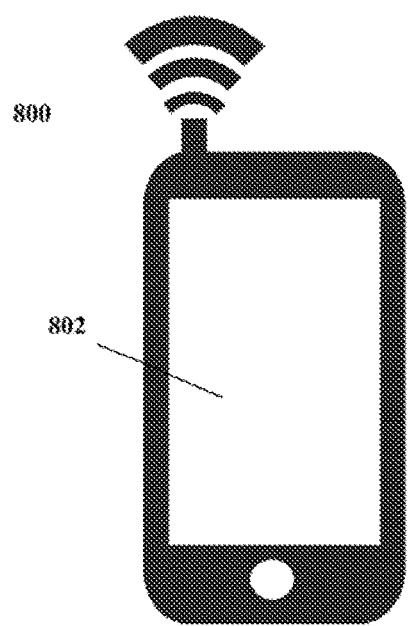
FIG. 8 illustrates a schematic diagram of an exemplary display device consistent with disclosed embodiment

The present disclosure further provides a display device. FIG. 8 illustrates a schematic diagram of an exemplary display device consistent with disclosed embodiments. As shown in FIG. 8, the display device 800 may include any one of the disclosed display panel 802. For example, the display device 800 may be a smartphone, a tablet, a wearable device, etc., which is capable of displaying images and/or videos. Although a smartphone is illustrated in FIG. 8, the display device 800 may be any electronic device or any electronic component capable of displaying images and/or videos and including any one of the disclosed display panel 802. Because the display device includes any one of the disclosed display panel, the display device may also exhibit the same advantages as the disclosed display panel.

In the disclosed embodiments, the adjacent color units with the same color in a same color unit row may be configured to correspond to the pixel units within which the direction of the electric filed is inverted. That is, the adjacent color units with the same color in a same color unit row may correspond to the pixel units with the reversed polarity. In addition, the color units with the same color in a same color unit row may correspond to an equal number of positive polarity pixel units and negative polarity pixel units. The image flickering, caused by the color units with the same color in a same color unit row corresponding to the pixel units with the same polarity, may be minimized, because the flickering in the adjacent color units with the same color in a same color unit row may be cancelled out. Accordingly, the image quality may be enhanced, especially when a single color image or a noticeable single color image element is displayed.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodi-

What is claimed is:

1. A display panel, comprising:
a first substrate including a plurality of scanning lines, a plurality of data lines intersecting the scanning lines and providing data signals, and a plurality of pixel units defined by the scanning lines and the data lines, wherein the plurality of pixel units include a plurality of first pixel units and a plurality of second pixel units; and
a second substrate including a plurality of color units of four different colors and one-to-one corresponding to the plurality of pixel units, wherein the plurality of color units include a plurality of first color units, a plurality of second color units, a plurality of third color units, and a plurality of fourth color units,
wherein the plurality of pixel units are arranged into a plurality of first pixel groups and a plurality of second pixel groups alternately arranged along an extending direction of the scanning lines,
a first pixel group includes an equal number of first pixel units and second pixel units,
a second pixel group includes an equal number of first pixel units and second pixel units,
an arrangement of the first pixel units and the second pixel units in the first pixel group is a mirror image of an arrangement of the first pixel units and the second pixel units in the second pixel group,
when the data signals with a same polarity are provided to the first pixel units and the second pixel units through the data lines, the first pixel units generate an electric field having an inverted direction from an electric field generated by the second pixel units, and along the extending direction of the scanning lines, an electric field of a pixel unit in the first pixel group has a same direction as an electric field of a pixel unit in the second pixel group adjacent to the pixel unit in the first pixel group, and
in a same row of the color units, adjacent color units with a same color correspond to the pixel units with a reversed polarity, and the color units with the same color correspond to an equal number of positive polarity pixel units and negative polarity pixel units.

2. The display panel according to claim 1, wherein:
the first pixel groups and the second pixel groups are alternately arranged along an extending direction of the data lines.

3. The display panel according to claim 1, wherein:
in the first pixel groups and the second pixel unit groups, the first pixel units and the second pixel units are alternately arranged along the extending direction of the scanning lines, or
in the first pixel groups and the second pixel unit groups, every two first pixel units and every two second pixel units are alternately arranged along the extending direction of the scanning lines.

4. The display panel according to claim 3, wherein:
along the extending direction of the scanning lines, a total number of the first pixel units and the second pixel units included in the first pixel group is a positive integer multiple of 4; and
along the extending direction of the scanning lines, a total number of the first pixel units and the second pixel units included in the second pixel group is a positive integer multiple of 4.

5. The display panel according to claim 4, wherein:
the first pixel group includes two first pixel units and two second pixel units, wherein the first pixel units and the second pixel units are alternately arranged in the extending direction of the scanning lines; and
the second pixel group includes two first pixel units and two second pixel units, wherein the first pixel units and the second pixel units are alternately arranged in the extending direction of the scanning lines.

6. The display panel according to claim 4, wherein:
the first pixel group includes two first pixel units and two second pixel units, wherein every two first pixel units and every two second pixel units are alternately arranged in the extending direction of the scanning lines; and
the second pixel group includes two first pixel units and two second pixel units, wherein every two first pixel units and every two second pixel units are alternately arranged in the extending direction of the scanning lines.

7. The display panel according to claim 1, further including:
a plurality of source electrode driving units connected to the data lines, and configured to input the data signals for column inversion or frame inversion to the data lines.

8. The display panel according to claim 1, wherein:
a plurality of first color groups are repeatedly arranged along the extending direction of the scanning lines,
wherein each first color group includes one first color unit, one second color unit, one third color unit, and one fourth color unit sequentially arranged along the extending direction of the scanning lines.

9. The display panel according to claim 1, wherein:
a plurality of second color groups are repeatedly arranged along an extending direction of the data lines,
wherein each second color group includes one first color unit and one second color unit in one color unit row, as well as one third unit and one fourth color unit in a next color unit row.

10. The display panel according to claim 1, wherein:
a plurality of third color group are repeatedly arranged along an extending direction of the data lines,
wherein each third color group includes one third unit and one fourth color unit in one color unit row, as well as one first color unit and one second color unit in the next color unit row.

11. The display panel according to claim 1, wherein:
the first color units, the second color units, the third color units, and the fourth color units are red color units, green color units, blue color units, and white color units, respectively, or red color units, green color units, blue color units, and orange color units, respectively, or red color units, green color units, blue color units, and yellow color units, respectively.

12. The display panel according to claim 1, wherein:
the first pixel unit includes a common electrode and a pixel electrode disposed on a surface of the first substrate facing the second substrate; and
the second pixel unit includes a common electrode and a pixel electrode disposed on a surface of the first substrate facing the second substrate,
wherein a relative position between the pixel electrode and the common electrode in the first pixel unit is opposite to a relative position between the pixel electrode and the common electrode in the second pixel unit.

13. The display panel according to claim 12, wherein:
a passivation layer is disposed between the common electrode of the first pixel unit and the common electrode of the second pixel unit adjacent to the first pixel unit; and
the common electrode of the first pixel unit is electrically connected to the common electrode of the second pixel unit adjacent to the first pixel unit through at least one through-hole disposed in the passivation layer.

14. The display panel according to claim 13, wherein:
in the first pixel unit, the pixel electrode is disposed between the second substrate and the common electrode; and
in the second pixel unit, the common electrode is disposed between the second substrate and the pixel electrode.

15. The display panel according to claim 13, wherein:
in the first pixel unit, the common electrode is disposed between the second substrate and the pixel electrode; and
in the second pixel unit, the pixel electrode is disposed between the second substrate and the common electrode.

16. The display panel according to claim 12, wherein:
in the first pixel unit and the second pixel unit, the pixel electrode and the common electrode are disposed in a same layer; and
along an orientation direction of the pixel electrode and the common electrode, an arrangement of the common electrode and the pixel electrode in the first pixel unit is opposite to an arrangement of the common electrode and the pixel electrode in the second pixel unit.

17. A display device comprising a display panel, wherein the display panel comprises:
a first substrate including a plurality of scanning lines, a plurality of data lines intersecting the scanning lines and providing data signals, and a plurality of pixel units defined by the scanning lines and the data lines, wherein the plurality of pixel units include a plurality of first pixel units and a plurality of second pixel units; and
a second substrate including a plurality of color units of four different colors and one-to-one corresponding to the plurality of pixel units and including, wherein the plurality of color units include a plurality of first color units, a plurality of second color units, a plurality of third color units, and a plurality of fourth color units,
wherein the plurality of pixel units are arranged into a plurality of first pixel groups and a plurality of second pixel groups alternately arranged along an extending direction of the scanning lines,
a first pixel group includes an equal number of first pixel units and second pixel units,
a second pixel group includes an equal number of first pixel units and second pixel units,
an arrangement of the first pixel units and the second pixel units in the first pixel group is a mirror image of an arrangement of the first pixel units and the second pixel units in the second pixel group,
when the data signals with a same polarity are provided to the first pixel units and the second pixel units through the data lines, the first pixel units generate an electric field having an inverted direction from an electric field generated by the second pixel units, and along the extending direction of the scanning lines, an electric field of a pixel unit in the first pixel group has a same direction as an electric field of a pixel unit in the second pixel group adjacent to the pixel unit in the first pixel group, and
in a same row of the color units, adjacent color units with a same color correspond to the pixel units with a reversed polarity, and the color units with the same color correspond to an equal number of positive polarity pixel units and negative polarity pixel units.

18. A display panel, comprising:
a first substrate including a plurality of scanning lines, a plurality of data lines intersecting the scanning lines and providing data signals, and a plurality of pixel units defined by the scanning lines and the data lines, wherein the plurality of pixel units include a plurality of first pixel units and a plurality of second pixel units; and
a second substrate including a plurality of color units of four different colors and one-to-one corresponding to the plurality of pixel units, wherein the plurality of color units include a plurality of first color units, a plurality of second color units, a plurality of third color units, and a plurality of fourth color units,
wherein the plurality of pixel units are arranged into a plurality of first pixel groups and a plurality of second pixel groups alternately arranged along an extending direction of the scanning lines,
a first pixel group includes an equal number of first pixel units and second pixel units,
a second pixel group includes an equal number of first pixel units and second pixel units,
an arrangement of the first pixel units and the second pixel units in the first pixel group is a mirror image of an arrangement of the first pixel units and the second pixel units in the second pixel group,
when the data signals with a same polarity are provided to the first pixel units and the second pixel units through the data lines, the first pixel units generate an electric field having an inverted direction from an electric field generated by the second pixel units,
a plurality of first color groups are repeatedly arranged along the extending direction of the scanning lines, wherein each first color group includes one first color unit, one second color unit, one third color unit, and one fourth color unit sequentially arranged along the extending direction of the scanning lines, and
at least one conductive through-hole is disposed in a passivation layer to cross adjacent borders of adjacent first and second pixel units, to electrically connect a common electrode of the first pixel unit with a common electrode of the second pixel unit.

19. The display panel according to claim 18, wherein:
in the first pixel groups and the second pixel unit groups, the first pixel units and the second pixel units are alternately arranged along the extending direction of the scanning lines, or
in the first pixel groups and the second pixel unit groups, every two first pixel units and every two second pixel units are alternately arranged along the extending direction of the scanning lines.

20. The display panel according to claim 18, wherein:
the first pixel group includes two first pixel units and two second pixel units, wherein every two first pixel units and every two second pixel units are alternately arranged in the extending direction of the scanning lines; and
the second pixel group includes two first pixel units and two second pixel units, wherein every two first pixel units and every two second pixel units are alternately arranged in the extending direction of the scanning lines.

\* \* \* \* \*